(12) United States Patent
Wilson et al.

(10) Patent No.: US 10,113,419 B2
(45) Date of Patent: Oct. 30, 2018

(54) ELECTROMAGNETIC TELEMETRY USING A TRANSCEIVER IN AN ADJACENT WELLBORE

(71) Applicant: HALLIBURTON ENERGY SERVICES, INC., Houston, TX (US)

(72) Inventors: Glenn Andrew Wilson, Singapore (SG); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/512,642

(22) PCT Filed: Sep. 2, 2016

(86) PCT No.: PCT/US2016/050211
§ 371 (c)(1),
(2) Date: Mar. 20, 2017

(87) PCT Pub. No.: WO2017/131822
PCT Pub. Date: Aug. 3, 2017

(65) Prior Publication Data
US 2018/0038225 A1    Feb. 8, 2018

Related U.S. Application Data (60) Provisional application No. 62/286,644, filed on Jan. 25, 2016.

(51) Int. Cl.
*E21B 47/12*      (2012.01)
*H04B 10/40*      (2013.01)
(Continued)

(52) U.S. Cl.
CPC .......... *E21B 47/123* (2013.01); *E21B 47/122* (2013.01); *G01V 3/26* (2013.01); *G01V 3/34* (2013.01); *H04B 10/40* (2013.01)

(58) Field of Classification Search
CPC ..... E21B 47/123; E21B 47/122; H04B 10/40; G01V 3/26; G01V 3/34
See application file for complete search history.

(56) References Cited

U.S. PATENT DOCUMENTS

| | | |
|---|---|---|
| 4,389,645 A | 6/1983 | Wharton et al. |
| 7,072,044 B2 | 7/2006 | Kringlebotn et al. |

(Continued)

FOREIGN PATENT DOCUMENTS

| | | |
|---|---|---|
| WO | 2015094202 | 6/2015 |
| WO | 2015130298 | 9/2015 |

(Continued)

OTHER PUBLICATIONS

International Patent Application No. PCT/US2016/050211, International Search Report and Written Opinion, dated Nov. 28, 2016, 17 pages.

*Primary Examiner* — Leslie C Pascal
(74) *Attorney, Agent, or Firm* — Kilpatrick Townsend & Stockton LLP (57) ABSTRACT

A first transceiver positioned in a wellbore can transmit an electromagnetic signal. The electromagnetic signal can include encoded data. A second transceiver can be positionable at a surface of an adjacent wellbore and can include a computing device communicatively coupled to electrodes positionable in the adjacent wellbore. The electrodes can receive the electromagnetic signal and generate respective voltages in response to the electromagnetic signal. The computing device can determine a decoded version of the encoded data based on a voltage difference between the electrodes.

20 Claims, 6 Drawing Sheets

(51) Int. Cl.
    *G01V 3/26*     (2006.01)
    *G01V 3/34*     (2006.01)

(56) References Cited

U.S. PATENT DOCUMENTS

| | | |
|---|---|---|
| 7,515,774 B2 | 4/2009 | Vannuffelen et al. |
| 7,999,695 B2 | 8/2011 | Rodney et al. |
| 8,284,075 B2 | 10/2012 | Fincher et al. |
| 8,567,527 B2 | 10/2013 | Jeffryes et al. |
| 8,613,312 B2 | 12/2013 | Zolezzi-Garreton et al. |
| 8,733,431 B2 | 5/2014 | Upshall et al. |
| 8,740,455 B2 | 6/2014 | Hall et al. |
| 9,091,785 B2 | 7/2015 | Donderici et al. |
| 9,127,532 B2 | 9/2015 | Maida et al. |
| 2002/0196993 A1 | 12/2002 | Schroeder et al. |
| 2009/0261986 A1 | 10/2009 | Mehta et al. |
| 2010/0045296 A1 | 2/2010 | Tenghamn et al. |
| 2011/0017512 A1 | 1/2011 | Codazzi et al. |
| 2013/0271066 A1 | 10/2013 | Signorelli et al. |
| 2013/0300419 A1 | 11/2013 | Hibbs et al. |
| 2014/0191761 A1 | 7/2014 | San Martin et al. |
| 2014/0203174 A1 | 7/2014 | Skinner et al. |
| 2014/0222343 A1 | 8/2014 | Samson et al. |
| 2014/0318767 A1 | 10/2014 | Lemenager et al. |
| 2015/0268371 A1 | 9/2015 | Moss et al. |
| 2016/0017663 A1 | 1/2016 | Moeny |

FOREIGN PATENT DOCUMENTS

| | | |
|---|---|---|
| WO | 2015178876 | 11/2015 |
| WO | 2015199683 | 12/2015 |
| WO | 2015199684 | 12/2015 |

ELECTROMAGNETIC TELEMETRY USING A TRANSCEIVER IN AN ADJACENT WELLBORE

CROSS-REFERENCE TO RELATED APPLICATIONS

This is a U.S. national phase under 35 U.S.C. 371 of International Patent Application No. PCT/US2016/050211, titled "Electromagnetic Telemetry Using a Transceiver in an Adjacent Wellbore" and filed Sept. 2, 2016, which claims the benefit of priority to U.S. Provisional Patent Application No. 62/286,644, titled "Electromagnetic Telemetry Using Surface and Downhole Electrodes" and filed Jan. 25, 2016, the entirety of each of which is hereby incorporated by reference herein.

TECHNICAL FIELD

The present disclosure relates generally to devices for use in well systems. More specifically, but not by way of limitation, this disclosure relates to performing electromagnetic telemetry using a transceiver in an adjacent wellbore.

BACKGROUND

A well system (e.g., an oil or gas well for extracting fluid or gas from a subterranean formation) can include a well tool. For example, a well system can include a logging while drilling (LWD) or a measuring while drilling (MWD) tool. It can be challenging to wirelessly communicate data from the well tool to the well surface for use by a well operator.

DETAILED DESCRIPTION

Certain aspects and features of the present disclosure relate to a bidirectional electromagnetic (EM) telemetry system that includes a surface transceiver at a surface of one wellbore and a downhole transceiver in an adjacent wellbore. The surface transceiver can detect an EM signal transmitted by the downhole transceiver and determine data encoded in the EM signal, and vice-versa. For example, the surface transceiver can be coupled, via a cable, to two electrodes positioned in the wellbore. The downhole transceiver can be positioned on a logging while drilling (LWD) tool or a measuring while drilling (MWD) tool within the adjacent wellbore. The downhole transceiver can communicate data (e.g., associated with a LWD or MWD process) to the surface transceiver by generating the EM signal. The EM signal can include the data encoded according to a predetermined encoding scheme. The EM signal can cause voltages to be generated on the electrodes of the surface transceiver. The surface transceiver can detect the voltages and determine, based on the voltages, characteristics of the EM signal. The surface transceiver can use the characteristic of the EM signal to decode the EM signal and determine the data.

In some examples, the surface transceiver can be coupled to an electrode positioned in the wellbore and another electrode positioned at a surface of the wellbore. The electrode positioned in the wellbore can be coupled to a casing string in the wellbore, a wall of the wellbore, a fluid in the wellbore, a well tool in the wellbore (e.g., the electrode can be a portion of the well tool), or any combination of these.

In some examples, the electrodes of the surface transceiver may not be coupled to any active components and can be electrically passive. For example, the electrodes may not consume power and at least some of the components in the wellbore to which the electrodes are coupled can be electrically passive. This can allow for transceiver implementations in which few active components (or no active components) need to be positioned in the wellbore.

For example, the electrodes of the surface transceiver can be electrically coupled to a passive material, such as an electrorestrictive material, in the wellbore. The passive material can in turn be mechanically (e.g., physically) coupled or bonded to a fiber optic cable that extends from the electrodes to the surface transceiver. In response to an EM signal, a voltage can be generated across the electrodes. The voltage across the electrodes can be applied across the passive material due to the electrical coupling between the electrodes and the passive material. This can cause the passive material to change in shape. As the passive material changes in shape, the passive material can change an amount of strain on the fiber optic cable. The surface transceiver can determine the amount of strain by transmitting optical waves through the fiber optic cable and detecting characteristics of reflections of the optical waves. The surface transceiver can determine a voltage across the electrodes based on the amount of strain. For example, there can be a proportional relationship between the voltage across the electrodes and the amount of strain on the fiber optic cable. The surface transceiver can then determine the data encoded in the EM signal based on the voltage across the electrodes.

Some examples of the present disclosure can improve a signal-to-noise ratio (SNR) for EM signals communicated between the downhole transceiver and the surface transceiver (e.g., as discussed in greater detail below). Also, some examples can avoid positioning active components in a wellbore, which can be challenging and expensive to power. Additionally, some examples can use a fiber optic system to avoid the substantial attenuation that can occur when electrical signals are transmitted over significant distances (e.g., from the downhole electrodes to the well surface) using a wireline.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
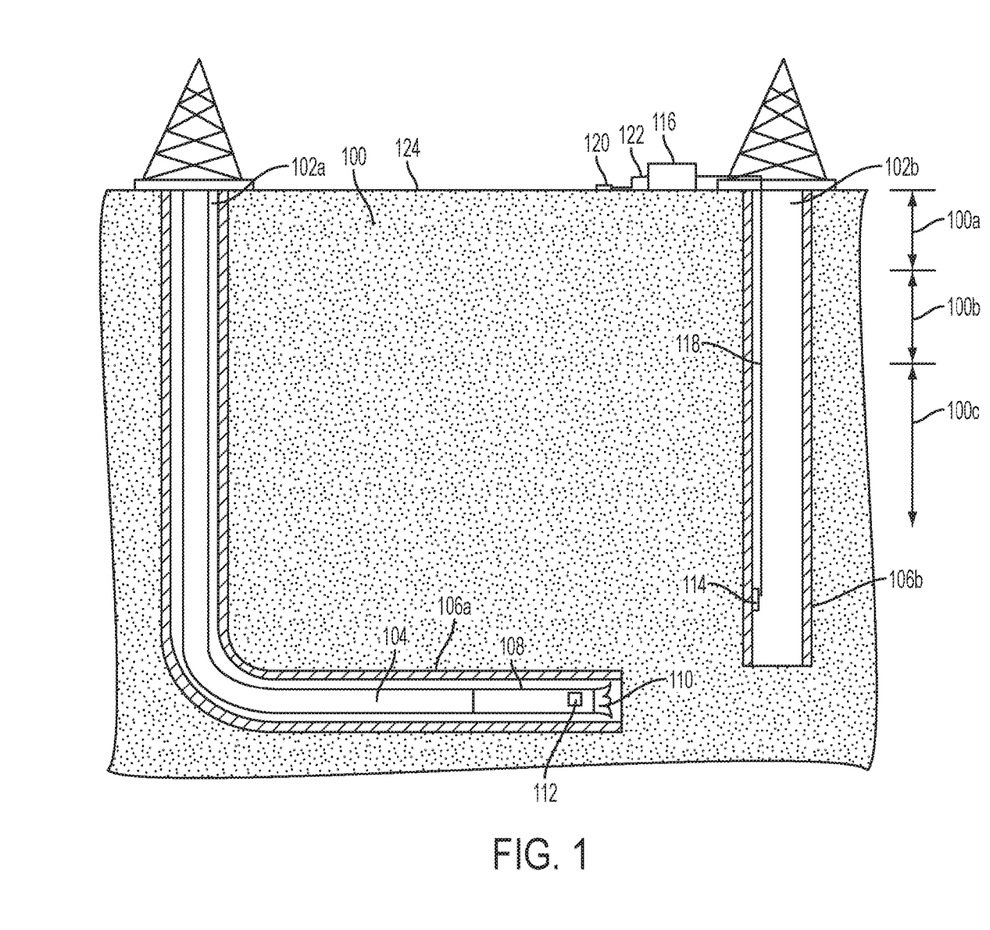
FIG. 1 is a cross-sectional side view of an example of an electromagnetic (EM) telemetry system distributed among a wellbore and an adjacent wellbore according to some aspects.

FIG. 1 is a cross-sectional side view of an example of an EM telemetry system distributed among a wellbore 102a and an adjacent wellbore 102b according to some aspects. The wellbores 102a-b can extend through various earth strata that form a subterranean formation 100. The wellbores 102a-b can be vertical, deviated, horizontal, or any combination of these. The wellbores 102a-b can be positioned onshore or offshore.

The wellbores 102a-b can be adjacent or proximate to one another. For example, wellbore 102a can be within 100 feet of wellbore 102b. The wellbores 102a-b can be within any suitable range of one another for implementing the EM telemetry system. In some examples, the EM telemetry system can be deployed in preexisting wellbores 102a-b. In other examples, at least one of the wellbores 102a-b can be drilled specifically for implementing the EM telemetry system.

In some examples, the wellbore 102a includes a casing string 106a that extends from the well surface 124 to the subterranean formation 100. The casing string 106a can provide a conduit through which formation fluids, such as production fluids produced from the subterranean formation 100, can travel from the wellbore 102a to the well surface 124. The casing string 106a can be coupled to the walls of the wellbore 102a via cement. For example, a cement sheath can be positioned or formed between the casing string 106a and the walls of the wellbore 102a for coupling the casing string 106a to the wellbore 102a. In other examples, the wellbore 102a may not include the casing string 106a (e.g., the wellbore 102a can be open hole).

In some examples, the wellbore 102b includes a casing string 106b. The casing string 106b can be coupled to the walls of the wellbore 102b via cement (e.g., as discussed above). In other examples, the wellbore 102b may not include the casing string 106b.

In the example shown in FIG. 1, the wellbore 102a includes a well tool 104. The well tool 104 can include a logging while drilling (LWD) tool or a measuring while drilling (MWD) tool. In some examples, the well tool 104 can be coupled to a wireline, slickline, or coiled tube for deploying the well tool 104 into the wellbore 102a. The well tool 104 can include various sensors, subsystems, and components. For example, the well tool 104 can include a communication subsystem, a saver subsystem, a rotary steerable system, a mud motor, a MWD module, a bottom hole assembly 108, a gap subsystem, a drill bit 110, or any combination of these. In other examples, the wellbore 102a may not include the well tool 104. Similarly, the wellbore 102b may or may not include a well tool, such as well tool 104 discussed above.

The wellbores 102a-b can include transceivers 112, 116, which can form the EM telemetry system. The transceivers 112, 116 can be coupled to (or have components positioned on) respective well tools, coupled to respective casing strings 106a-b, positioned in the respective wellbores 102a-b via wires or cables, positioned at the well surface 124, or any combination of these.

The transceivers 112, 116 can each include or be coupled to one or more electrodes. An electrode can include an electrically conductive material, such as metal. For example, the transceiver 112 can include electrodes positioned on either side of an electrically insulative segment, which can be referred to as a gap sub, in the bottom hole assembly 108 of the well tool 104. As another example, the transceiver 112 can include electrodes positioned on either side of an electrically insulative material, which can be referred to as a gap, in the casing string 106a. As another example, the transceiver 112 can include electrodes disposed in the wellbore 102a via cables or wires. For example, the transceiver 112 can include electrodes dangling in the wellbore 102a on cables.

The transceiver 116 can be coupled to electrodes positioned according to any of the configurations discussed above, among other configurations. For example, the transceiver 116 can be coupled to one electrode 114 positioned in the wellbore 102b and another electrode 120 positioned at the well surface 124. In some examples, the electrode 114 can be electrically coupled to the casing string 106b or a fluid in the wellbore 102b. The electrodes 114, 120 can be sufficiently spaced apart such that they each behave as monopole electrodes. The electrodes 114, 120 can be capacitive to reduce or remove the effects of contact resistance or temperature, or other detrimental effects, on voltage readings obtained using the electrodes 114, 120 (e.g., as discussed in greater detail below). The transceiver 116 can be coupled to electrodes 114, 120 via cables 118, 122, such as wires.

Figure 2:
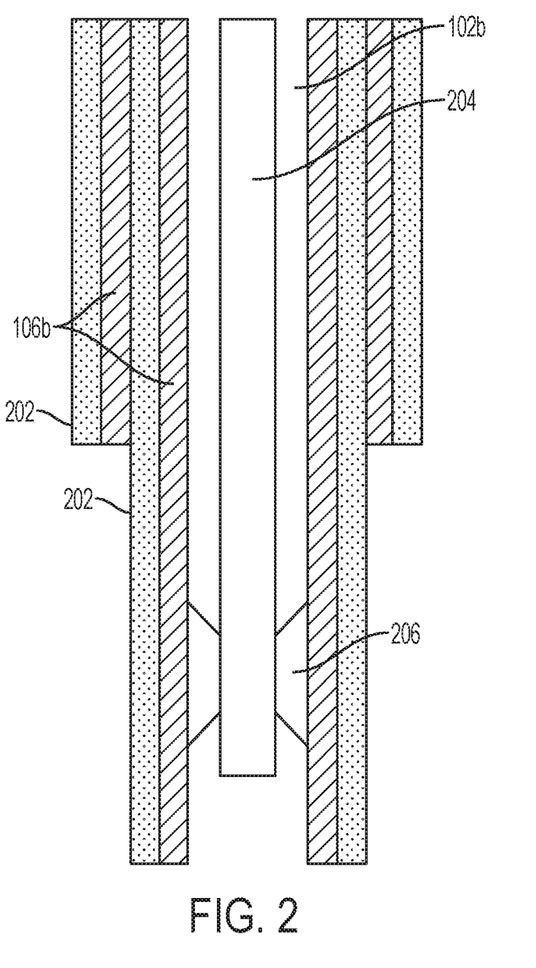
FIG. 2 is a cross-sectional side view of an example of a portion of a wellbore that includes an electrode for a transceiver according to some aspects.

In some examples, the electrode 114 can be formed from at least a portion of a well tool. For example, referring to FIG. 2, the wellbore 102b can include the casing string 106b, cement 202, and a well tool 204. The well tool 204 can include calipers, arms, pads, or another component 206 that can couple with the casing string 106b (e.g., to position or stabilize the well tool 204 in the wellbore 102b). In some examples, the well tool 204 can be electrically passive. The component 206 can include a metal material and can be the electrode 114 for the transceiver 116. In some examples, a cable can extend through the well tool 204 for coupling the component 206 to the transceiver 116.

The EM telemetry system can provide bidirectional communication between the transceiver 112 in the wellbore 102a and the transceiver 116 at well surface 124. For example, the transceiver 112 can communicate data to the transceiver 116, and vice-versa, during drilling operations, MWD operations, or LWD operations. Examples of the data can include temperature, pressure, direction, formation resistivity, or any combination of these.

In some examples, the transceiver 112 can communicate encoded data to the transceiver 116 by applying a modulated voltage across a gap sub of the bottom hole assembly 108. This can produce a modulated EM signal that includes the encoded data. The EM signal can propagate through the subterranean formation 100 and generate a modulated voltage between the electrodes 114, 120. The transceiver 116 can measure (e.g., via voltmeters) the modulated voltage at the electrodes 114, 120. In some examples, the transceiver 116 can use an amplifier (e.g., a high input-impedance preamplifier circuit), a filter, or both to reduce current draw between the electrodes 114, 120 or otherwise process the modulated voltage. The transceiver 116 can determine a received voltage ($V_r$) at the electrodes 114, 120 by calculating the line integral (e.g., $\int_{-z}^{+z} E_z(z) dl$) of an electric field between the electrodes 114, 120. The transceiver 116 can use the received voltage to determine the encoded data transmitted by the transceiver 106.

As another example, the transceiver 116 can communicate data to the transceiver 112 by causing an electrical current (e.g., a modulated current) to be applied to the electrodes 120, 114. The transceiver 116 can use a current generator (e.g., a low output-impedance current generator) to generate the current. The current can cause the electrode 114, the electrode 120, or both to generate an EM signal. The EM signal can propagate through the subterranean formation 100 and generate a voltage at the transceiver 112 (e.g., at electrodes of the transceiver 112). The transceiver 112 can use the voltage to determine the data.

In some examples, the EM telemetry system can transmit data between the transceivers 112, 116 using frequencies at or above 15 Hertz (Hz), enabling higher bandwidth and data rates. The EM telemetry system can transmit data between the transceivers 112, 116 using an encoding scheme. For example, the EM telemetry system can use pulse width modulation ("PWM"), pulse position modulation ("PPM"), on-off keying ("OOK"), amplitude modulation ("AM"), frequency modulation ("FM"), single-side-band modulation ("SSB"), frequency shift keying ("FSK"), phase shift keying ("PSK") (e.g., binary phase shift keying ("BPSK") and M-ary shift keying), discrete multi-tone ("DMT"), orthogonal frequency division multiplexing ("OFDM"), or any combination of these for communicating data between the transceivers 112, 116.

In some examples, positioning one electrode 120 at the well surface 124 and another electrode 114 in the wellbore 102b can improve a signal-to-noise ratio of the EM telemetry system, a range of the EM telemetry system, or both. Improving the range of the EM telemetry system may allow for the drilling of longer wellbores. For example, the subterranean formation 100 can include a 50 meter (m) thick conductive layer 100b positioned between two 200 m thick resistive layers 100a, 100c. The conductive layer 100b can have a resistivity of 0.01 Ohm-m. The resistive layers 100a-b can have resistivities of 2.6 ohm-m. At a shallow depth (e.g., 1500 m), a traditional EM telemetry may be unreliable due to the conductive layer 100b. But some examples of the present disclosure can improve reliability over traditional EM telemetry methods by producing higher signal levels than traditional telemetry systems can produce. For example, if the electrode 114 is electrically coupled to fluid in the wellbore 102b, and the wellbore 102b is partially cased with a final 91 m long open-hole section, the EM telemetry system can have a signal level on the order of millivolts (mV). This is substantially higher than a traditional EM telemetry system under such conditions. As another example, if the electrode 114 is electrically coupled to the casing string 106b in the wellbore 102b, and the wellbore is completely cased, the EM telemetry system can again have a signal level on the order of mV. As still another example, if the electrode 114 is electrically coupled to fluid in the wellbore 102b, and the wellbore is completely cased, the EM telemetry system can have a signal level around 20 microvolts ($\mu$V), which can be substantially higher than a traditional EM telemetry system under such conditions. The high signal levels can allow the EM telemetry system to operate with a large SNR, enabling the adjacent wellbore 102b to be distant from the wellbore 102a.

Figure 3:
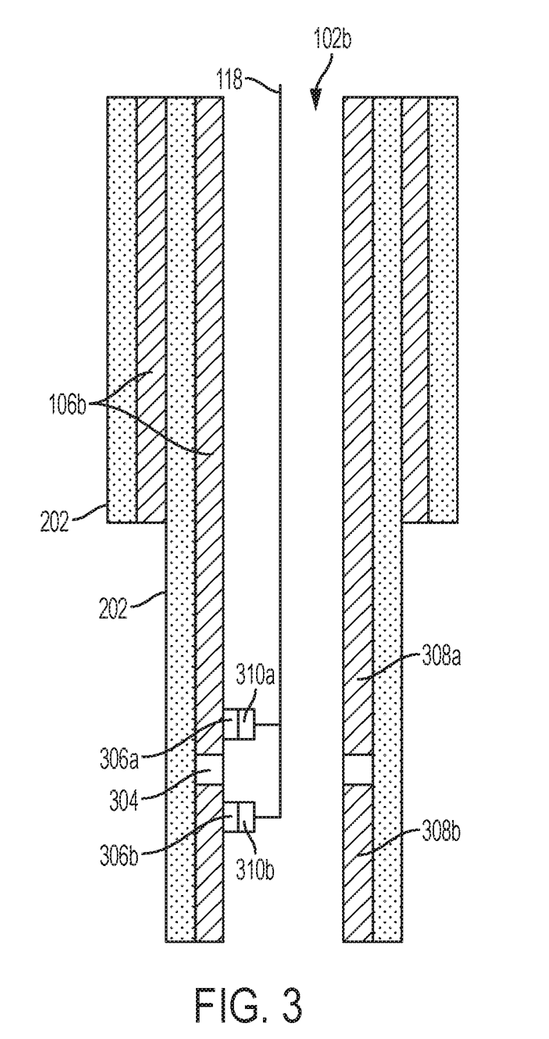
FIG. 3 is a cross-sectional side view of another example of a portion of a wellbore that includes an electrode for a transceiver according to some aspects.

Other arrangements of the electrodes coupled to the transceivers 112, 116 are also possible, and may result similar or higher signal levels. For example, the transceiver 116 can be coupled to electrodes positioned on either side of a gap in the casing string 106b, as shown in FIG. 3. In FIG. 3, a gap 304 is positioned for electrically separating one portion 308a of the casing string 106b from another portion 308b of the casing string 106b. In some examples, the gap 304 can be 6 meters long (e.g., a longitudinal length of the gap can be 6 meters long). One electrode 306a can be coupled to one portion 308a of the casing string 106b. The other electrode 306b can be coupled to the other portion 308b of the casing string 106b. The electrodes 306a-b can be coupled to the transceiver 116 via cable 118.

Bi-directional communication can be effectuated using a similar process as discussed above. For example, the transceiver 112 can communicate encoded data to the transceiver 116 by applying a modulated voltage across a gap sub of the bottom hole assembly 108. This can produce a modulated EM signal that includes the encoded data. The EM signal can propagate through the subterranean formation 100 and generate a modulated voltage between the electrodes 306a-b. The transceiver 116 can measure (e.g., via voltmeters) the modulated voltage at the electrodes 306a-b. The transceiver 116 can determine a received voltage ($V_r$) at the electrodes 306a-b by calculating the line integral of an electric field between the electrodes 306a-b. The transceiver 116 can use the received voltage to determine the encoded data transmitted by the transceiver 106.

As another example, the transceiver 116 can communicate data to the transceiver 112 by causing an electrical current (e.g., a modulated current) to be applied to the electrodes 306a-b. The current can cause the electrode 306a, the electrode 306b, or both to generate an EM signal. The EM signal can propagate through the subterranean formation 100 and generate a voltage at the transceiver 112 (e.g., at electrodes of the transceiver 112). The transceiver 112 can use the voltage to determine the data.

Although some examples have been described above, the transceivers 112, 116 can each include any number, combination, and configuration of electrodes for implementing the EM telemetry system. Further, the EM telemetry system can include any number and combination of transceivers that can communicate with one another. In some examples, an electrode 114 positioned in a wellbore 102b can be used for communication with multiple transceivers positioned in several wellbores across a large area. For example, the electrode 114 in wellbore 102b can be used for sequential or concurrent communication with multiple transceivers in multiple other wellbores.

In some examples, the electrodes 306a-b can be coupled to electrical circuitry 310a-b. The circuitry 310a-b can include a high input-impedance (e.g., 1 mega ohm) amplifier, a filter, or both of these. The circuitry 310a-b can transmit amplified versions of the voltage generated at the electrodes 306a-b to the transceiver 112 via the cable 118. Because there can be significant distance (e.g., several kilometers) between the electrodes 306a-b and the well surface 124, the amplified versions of the voltage can significantly attenuate as they propagate through the cable 118 to the well surface 124. In some examples, increased power can be supplied to the circuitry 310a-b by the cable 118 and used by the circuitry 310a-b to offset the attenuation.

In some examples, the electrodes 306a-b may not be coupled to any active components (e.g., downhole), and can each be electrically passive. For example, the electrodes 306a-b may not consume power and the circuitry 310a-b can be electrically passive. This can allow for EM telemetry system implementations in which few active components (or no active components) need to be positioned in the wellbore 102b. One example of such electrically passive circuitry 310a-b is shown in FIGS. 4-5.

Figure 4:
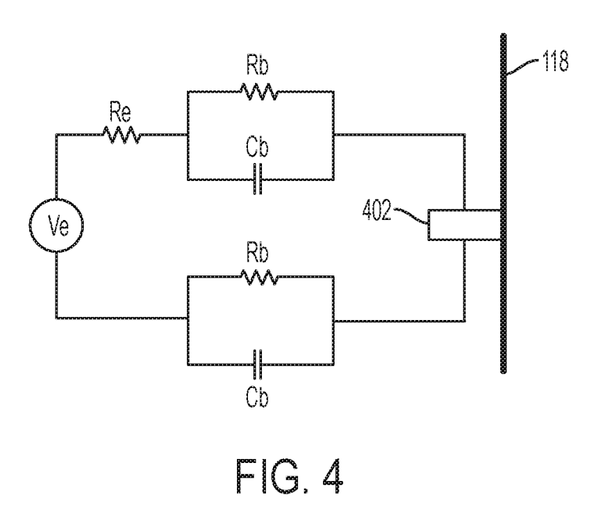
FIG. 4 is a schematic view of an example of a portion of an EM telemetry system according to some aspects.

FIG. 4 is a schematic view of an example of a portion of an EM telemetry system according to some aspects. FIG. 4 shows representations of two electrodes, with each electrode being represented by a resistor having a resistance (Rb) in parallel with a capacitor having capacitance (Cb). A voltage (Ve) can be detected by the electrodes and cause a material 402 (e.g., an electrorestrictive material) coupled to the electrodes to expand, contract, or otherwise change shape. Examples of the material 402 can include lead zirconate titanate (PZT), a lithium nobate phase modulator, or a ferroelectric material. As the material 402 changes shape, the material 402 can press against or otherwise induce a strain in the cable 118, to which the material 402 can be coupled or bonded. The cable 118 can include a fiber optic cable. The change in strain in the cable 118 can be detected at the well surface by a transceiver (e.g., an interrogation system of the transceiver 116 of FIG. 1). For example, the change in strain can cause an optical waveguide of a fiber optic cable to change, which can be detected by the transceiver. The transceiver can use predetermined relationship between the strain in the cable 118 and the voltage at the electrodes to determine the voltages at the electrodes.

More specifically, the voltage difference between the pair of electrodes can be applied across the material 402, causing a deformation of the material 402, which in turn can induce a strain on the cable 118. In examples in which the cable 118 is a fiber optic cable, the fiber optic cable can be remotely interrogated by the transceiver positioned at the well surface (e.g., transceiver 116 of FIG. 1) using a fiber-optic strain measurement method, such as an interferometric method, a fiber Bragg grating (FBG) method, a fiber laser strain (FLS) method, an extrinsic Fabry-Perot interferometric (EFPI) method, or any combination of these. The strain in the fiber optic cable can be proportional (e.g., linearly proportional) to the voltage difference applied across the material 402. The transceiver can use the proportional relationship between the strain in the fiber optic cable and the voltage difference applied across the material 402 to determine the voltages at the electrodes.

Figure 5:
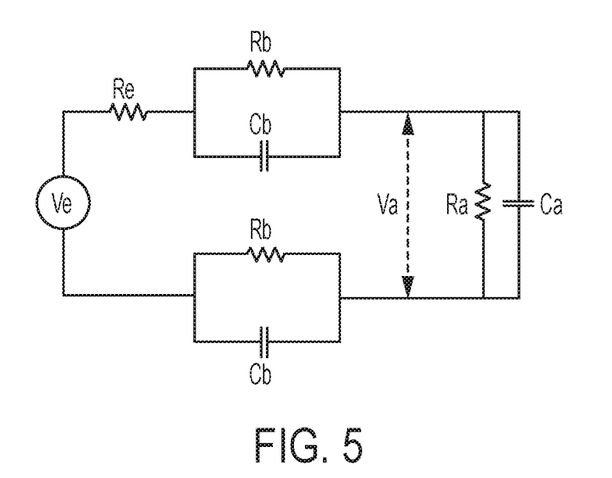
FIG. 5 is a schematic view of the example shown in FIG. 4 in which a material is represented as a resistor in parallel with a capacitor according to some aspects.

In some examples, the material 402 can be represented by a resistor having a resistance (Ra) in parallel with a capacitor having capacitance (Ca), as shown in FIG. 5 (which, for simplicity, does not include the cable 118). The circuits shown in FIGS. 4-5 can be designed such that the voltage across the electrodes (Ve) is equal to the voltage across the material 402 (Va), substantially independent of the resistance of the subterranean formation (Re) or the electrodes impedances (Rb). For example, the material 402 can have a high input impedance, or the circuit as a whole can be have a high input impedance. In examples in which the material 402 does not have a high input impedance, a resistor having a high resistance (e.g., 1 mega ohm) can be positioned in parallel to the material 402 to create the high input impedance. The high input impedance can enable the circuit to deliver a stable voltage from the electrodes to the material 402, unvaried by the impedance of the subterranean formation (Re). In some examples, the high input impedance can allow for the voltage difference between the two electrodes to be substantially equal to the voltage difference across the material 402 (e.g., independent of changes in the electrical coupling between the electrodes and the subterranean formation). For example, the electrodes and high impedance material 402 can be configured so that a transfer function of the circuit is effectively unchanged due to variations in the impedance of the subterranean formation.

As a particular example, the impedance ($Z_a$) of the material 402 can be:

$$Z_a = \frac{R_a}{1 + i\omega C_a R_a} \quad \text{Equation 1}$$

And the total impedance of the circuit ($Z_t$) can be:

$$Z_t = \frac{(1 + i\omega C_a R_a)(R_e + 2R_b + i\omega C_a R_a R_e) + R_a(1 + i\omega C_b R_b)}{(1 + i\omega C_a R_a)(1 + i\omega C_b R_b)} \quad \text{Equation 2}$$

A transfer function that represents a ratio of the voltage difference in the subterranean formation to the voltage difference across the material 402 can be:

$$\frac{V_a}{V_e} = \frac{Z_a}{Z_t} = \frac{R_a(1 + i\omega C_b R_b)}{(1 + i\omega C_a R_a)(R_e + 2R_b + i\omega C_b R_b R_e) + R_a(1 + i\omega C_b R_b)} \quad \text{Equation 3}$$

If the limit of $R_b \to \infty$, Equation 3 can reduce to:

$$\frac{V_a}{V_e} = \frac{i\omega C_b R_a}{(1 + i\omega C_a R_a)(2 + i\omega C_b R_e) + (i\omega C_b R_a)} \quad \text{Equation 4}$$

With a high impedance material 402 and high capacitance electrodes, frequencies above 1 Hz can be used so that $\omega C_b R_a$ is significantly greater than one. In some examples, the circuit can be designed so that $C_b$ is significantly greater than $C_a$. This can cause Equation 4 to reduce to:

$$\frac{V_a}{V_e} = \frac{1}{1 + i\omega C_a R_e} \quad \text{Equation 5}$$

In Equation 5, the transfer function is independent of the resistance of the earth until $\omega C_a R_e$ is greater than or equal to 0.01. It may follow that $C_b$ can be small (e.g., in the order of a few pF) to accommodate a large dynamic range in $R_e$ without impacting the transfer function.

If the limit of $R_b \gg R_e$, Equation 3 can reduce to:

$$\frac{V_a}{V_e} = \frac{(1 + i\omega C_b R_b)}{\frac{R_b}{R_a}(1 + i\omega C_a R_a)(2 + i\omega C_b R_e) + (1 + i\omega C_b R_b)} \quad \text{Equation 6}$$

In some examples, such as in a high frequency regime, $\omega C_b R_b$ can be significantly greater than one. In such examples, the circuit can be designed so that $C_b$ is significantly greater than $C_a$, and $R_a$ is significantly greater than $R_b$. This can cause Equation 6 to reduce to:

$$\frac{V_a}{V_e} = \frac{1}{1 + \frac{R_e}{R_a} + i\omega C_a R_e} \quad \text{Equation 7}$$

And Equation 7 can be approximately equal to Equation 5, which can indicate that if the circuit is designed so that $R_a$ is much larger than $R_b$ and $R_e$, the circuit can have the same response at high frequency as when the limit that $R_b \to \infty$. In some examples, by choosing values for the components of the circuit as discussed above, the circuit can be used with higher frequencies (e.g., 2-15 Hz) than traditional EM telemetry systems. This can enable the EM telemetry system to use significantly higher bandwidth for communications than other forms of EM telemetry, allowing for more data to be communicated at higher rates of speed.

As a specific example, the circuit can include electrodes that have an internal resistance (Rb) on the order of mega ohms, such as 1 mega ohm. The circuit can include a material 402 that is a lithium nobate phase modulator. The lithium nobate phase modulator can have an internal resistance (Ra) on the order of MΩ, such as 20 MΩ. The lithium nobate phase modulator can have an internal capacitance (Ca) on the order of picofarads (pF), such as 20 pF. The lithium nobate phase modulator can require at least 1 microvolt (μV) to be applied across it to change shape. In such an example, the resistance of the subterranean formation (Re) can be between 1-20Ω. By plugging these component values into Equation 7 and using a low frequency for the EM telemetry transmissions, 99.9% of the voltage across the electrodes (Ve) is applied across the material 402 (Va). Thus, the voltage across the electrodes is substantially equal to the voltage across the material 402, allowing for the material 402 to change shape and impart strain on the fiber optic cable.

Figure 6:
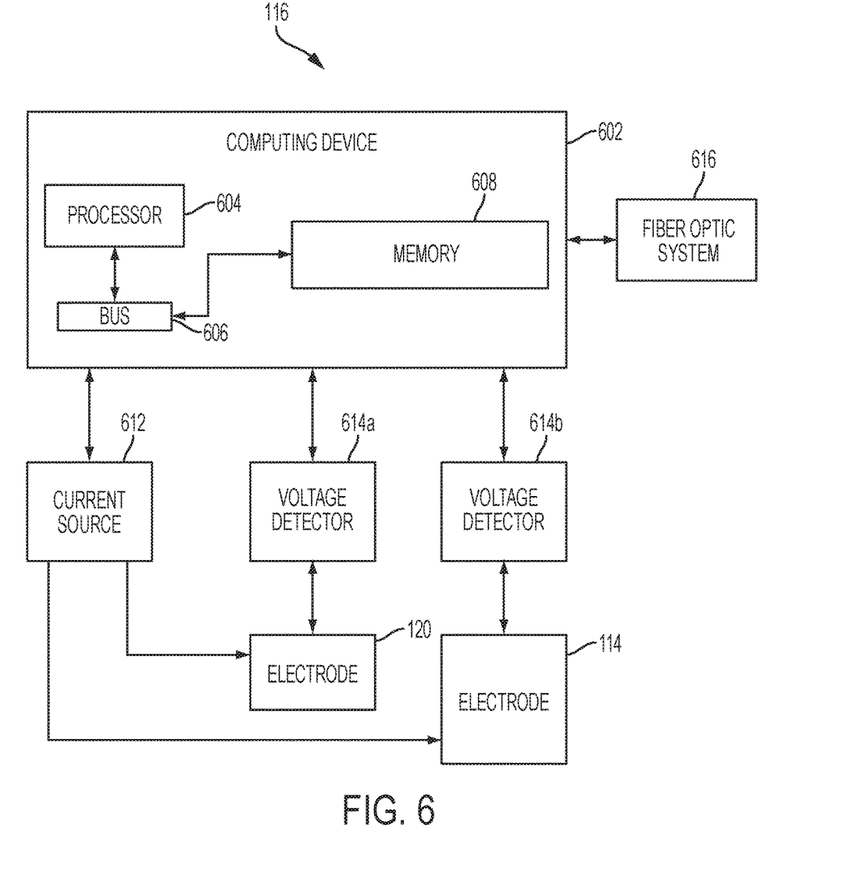
FIG. 6 is a block diagram of an example of a transceiver according to some aspects.

FIG. 6 is a block diagram of an example of a transceiver 116 according to some aspects. The transceiver 116 includes a computing device 602. The computing device 602 can include a processor 604, bus 606, memory 608, a communication device 610, etc. In some examples, some or all of the components shown in FIG. 6 (e.g., the processor 604, bus 606, communication device 610, memory 608, current source 612, voltage detectors 614a-b, fiber optic system 616, etc.) can be integrated into a single structure, such as a single housing. In other examples, some or all of the components shown in FIG. 6 can be distributed (e.g., in separate housings) and in electrical communication with each other.

The processor 604 can execute one or more operations for implementing any of the features of the present disclosure. The processor 604 can execute instructions stored in the memory 608 to perform the operations. The processor 604 can include one processing device or multiple processing devices. Non-limiting examples of the processor 604 include a Field-Programmable Gate Array ("FPGA"), an application-specific integrated circuit ("ASIC"), a microprocessor, etc.

The processor 604 can be communicatively coupled to the memory 608 via the bus 606. The non-volatile memory 608 may include any type of memory device that retains stored information when powered off. Non-limiting examples of the memory 608 include electrically erasable and programmable read-only memory ("EEPROM"), flash memory, or any other type of non-volatile memory. In some examples, at least some of the memory 608 can include a medium from which the processor 604 can read instructions. A computer-readable medium can include electronic, optical, magnetic, or other storage devices capable of providing the processor 604 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 608 can include a relationship for determining data communicated by another transceiver based on voltages detected at the electrodes 114, 120. For example, the memory 608 can include a line integral equation for determining data communicated by another transceiver 116 based on voltages detected at the electrodes 114, 120. As another example, the memory 608 can include a relationship between a detected strain imparted on cable 118 and voltages at the electrodes 114, 120.

The computing device 602 can be in electrical communication with voltage detectors 614a-b for detecting voltages associated with electrodes 114,120. An example of the voltage detector can be a voltmeter. The voltage detectors 614a-b can detect voltages at the electrodes 114, 120 and transmit associated signals to the computing device 602.

The computing device 602 can be in electrical communication with a current source 612, such as a current generator. The computing device 602 can operate the current source 612 to cause the current source 612 to apply current to the electrodes 114, 120. For example, to transmit data to another transceiver, the computing device 602 can cause the current source 612 to apply modulated current to the electrodes 114, 120. This can cause the electrodes 114, 120 to generate a modulated EM signal that communicates the data. The modulated EM signal can be detect and demodulated by the other transceiver to obtain the data.

In some examples, the computing device 602 can be in electrical communication with a fiber optic system 616. The fiber optic system 616 can include a laser, light source, or other optical transmitter. The fiber optic system 616 can additionally or alternatively include an interrogator. The fiber optic system 616 can additionally or alternatively include a sensor, such as a light sensor or other an optical sensor. In one example, the fiber optic system 616 can include an optical transmitter for transmitting optical waves through a fiber optic cable. The fiber optic system 616 can include a sensor for detecting characteristics of reflections from the optical waves. The fiber optic system 616 can transmit signals associated with the reflections to the computing device 602. The computing device 602 can determine, based on the characteristic of the reflections, a strain in a fiber optic cable coupled to the fiber optic system 616. The computing device 602 can further determine, based on the strain, a voltage across the electrodes 114, 120.

Although the above description is with respect to transceiver 116, transceiver 112 can include some or all of these components, among others.

Figure 7:
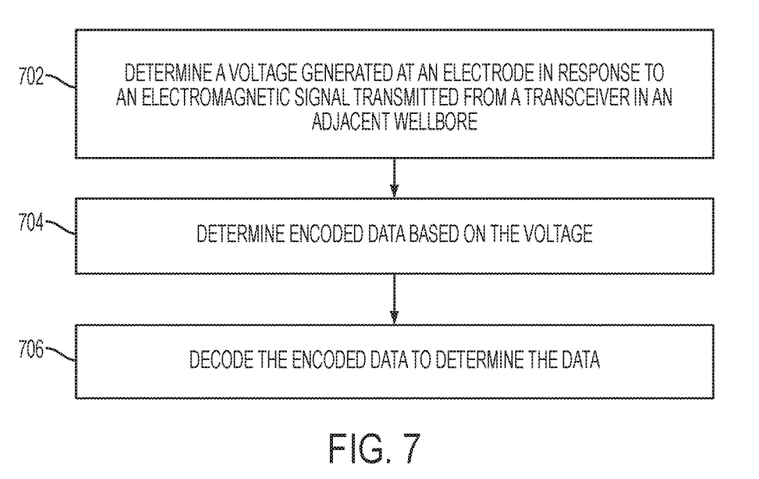
FIG. 7 is a flow chart showing an example of a process for implementing EM telemetry according to some aspects.

FIG. 7 is a flow chart showing an example of a process for implementing EM telemetry according to some aspects. Some examples can include more, fewer, or different steps than the steps depicted in FIG. 7. Also, some examples can implement the steps of the process in a different order. The steps below are described with reference to the components described above with regard to FIG. 6, but other implementations are possible.

In block 702, the computing device 602 determines a voltage generated at an electrode 114, electrode 120, or both of these in response to an EM signal transmitted from a transceiver in an adjacent wellbore. For example, the transceiver in the adjacent wellbore can apply a modulated voltage across an insulation gap in a casing string or a well tool in the adjacent wellbore. This can cause the EM signal to be transmitted. The EM signal can propagate through a subterranean formation between the transceiver and one or more electrodes 114, 120 of the transceiver 116. The EM signal can interact with the electrodes 114, 120 and cause a voltage to be generated at electrode 114, electrode 120, or both of these. The voltage detectors 614a-b can detect the voltages at the electrodes 114, 120 and transmit associated signals to the computing device 602. The computing device 602 can receive the signals and determine the voltages at the electrode 114, the electrode 120, or both of these. In some examples, the computing device 602 can determine a voltage difference between the electrodes 114, 120 based on one or more signals from the voltage detector(s) 614a-b.

In some examples, the EM signal (transmitted from the transceiver in the adjacent wellbore) can interact with the electrodes 114,120 and cause a voltage to be generated across the electrodes 114, 120. The voltage across the electrodes 114, 120 can be applied across a material, which can change shape in response to the voltage. For example, the length of the material can expand or contract proportionally to the amount of voltage applied across the material. The change in the shape of the material can cause an amount of strain on a fiber optic cable to change. The change in the strain in the fiber optic cable can cause a characteristic (e.g., a frequency, phase, timing, amplitude, or any combination of these) of an optical wave propagating through the fiber optic cable to change. The computing device 602 can determine (e.g., using the fiber optic system 616) the change in the characteristic of the optical wave and, based on the change in the characteristic, determine an amount of voltage applied across the material. Because the voltage applied across the material can be substantially equal to the voltage applied across the electrodes 114, 120, the computing device 602 can use the voltage across the material as a proxy for the voltage applied across the electrodes 114, 120.

In block 704, the computing device 602 determines encoded data based on the voltage. For example, the EM signal can include or carry encoded data. The encoded data can be data that is encoded in the EM signal using one or more encoding schemes. The EM signal can cause a characteristic (e.g., a frequency, amplitude, timing, waveform, or any combination of these) of the voltages generated at the electrodes 114, 120 to fluctuate based on the encoding scheme. The computing device 602 can detect the fluctuating voltages (e.g., via the voltage detectors 614a-b or fiber optic system 616) and determine the encoded data based on the fluctuating voltages.

For example, the EM signal can be modulated according to a frequency modulation or amplitude modulation scheme to encode the data in the EM signal. This can cause a frequency-modulated voltage or an amplitude-modulated voltage to be generated on the electrodes 114, 120. The computing device 602 can determine the frequency-modulated voltage or the amplitude-modulated voltage at the electrodes 114, 120. For example, the computing device 602 can use an analog-to-digital (A/D) converter to sample or otherwise convert analog voltage signals from the voltage detectors 614a-b to digital signals and store information associated with the digital signals in memory. The computing device 602 can analyze the digital signals to identify the frequency modulation or the amplitude modulation. The computing device 602 can then determine the encoded data based on the frequency modulation or the amplitude modulation.

In block 706, the computing device 602 decodes the encoded data to determine the data. For example, the computing device 602 can demodulate frequency-modulated data or amplitude-modulated data to determine the data. The computing device 602 can apply one or more decoding techniques to the encoded data to derive the data from the encoded data.

In some aspects, a transceiver in an adjacent wellbore can be used for electromagnetic telemetry according to one or more of the following examples:

Example #1: A system can include a downhole transceiver coupled to a well tool that is positionable in a wellbore for transmitting an electromagnetic signal with encoded data. The system can include a first electrode positionable in an adjacent wellbore for receiving the electromagnetic signal and generating a first voltage in response to the electromagnetic signal. The system can include a second electrode positionable in the adjacent wellbore or at a surface of the wellbore for receiving the electromagnetic signal and generating a second voltage in response to the electromagnetic signal. The system can include a surface transceiver communicatively coupled to the first electrode and the second electrode for determining a decoded version of the encoded data based on a voltage difference between the first electrode and the second electrode.

Example #2: The system of Example #1 may feature the well tool being a logging while drilling tool or a measuring while drilling tool.

Example #3: The system of any of Examples #1-2 may feature the encoded data being encoded in the electromagnetic signal using pulse width modulation, pulse position modulation, on-off keying, amplitude modulation, frequency modulation, single-side-band modulation, frequency shift keying, phase shift keying, discrete multi-tone, orthogonal frequency division multiplexing, or any combination of these.

Example #4: The system of any of Examples #1-3 may feature the surface transceiver including a processing device and a memory device in which instructions executable by the processing device are stored for causing the processing device to determine the encoded data based on the voltage difference, and determine the decoded version of the encoded data by decoding the encoded data.

Example #5: The system of any of Examples #1-4 may feature the first electrode being positioned on a first portion of a casing string in the adjacent wellbore and the second electrode being positioned on a second portion of the casing string that is separated from the first portion by an insulation layer.

Example #6: The system of any of Examples #1-4 may feature the first electrode being positioned in the adjacent wellbore and the second electrode being positioned at the surface of the adjacent wellbore.

Example #7: The system of any of Examples #1-4 and 6 may feature the first electrode being a part of a second well tool positioned in the adjacent wellbore.

Example #8: The system of any of Examples #1-7 may feature a fiber optic cable coupled to the surface transceiver. A material can be coupled to the fiber optic cable and at least one of the first electrode or the second electrode for changing a strain on the fiber optic cable in response to the voltage difference between the first electrode and the second electrode.

Example #9: The system of Example #8 may feature the material including an electrorestrictive material. The surface transceiver can include a processing device and a memory device in which instructions executable by the processing device are stored for causing the processing device to receive, from an optical sensor, sensor signals indicating a change in the strain on the fiber optic cable. The instructions can also cause the processing device to determine, based on the change in the strain, the voltage difference between the first electrode and the second electrode.

Example #10: The system of any of Examples #8-9 may feature the material and the first electrode forming at least a portion of an electrical circuit that is positionable in the adjacent wellbore. The electrical circuit can be electrically passive. The electrical circuit can have an input impedance that is greater than 1 mega ohm.

Example #11: A transceiver can include a first electrode positionable in a wellbore for receiving, from another transceiver positioned in an adjacent wellbore, an electromagnetic signal that includes encoded data and generating a first voltage in response to the electromagnetic signal. The transceiver can include a second electrode positionable in the wellbore or at a surface of the wellbore for receiving the electromagnetic signal and generating a second voltage in response to the electromagnetic signal. A computing device can be communicatively coupled to the first electrode and the second electrode for determining a decoded version of the encoded data based on a voltage difference between the first electrode and the second electrode.

Example #12: The transceiver of Example #11 may feature the encoded data being encoded in the electromagnetic signal using pulse width modulation, pulse position modulation, on-off keying, amplitude modulation, frequency modulation, single-side-band modulation, frequency shift keying, phase shift keying, discrete multi-tone, orthogonal frequency division multiplexing, or any combination of these.

Example #13: The transceiver of any of Examples #11-12 may feature the computing device including a processing device and a memory device in which instructions executable by the processing device are stored for causing the processing device to determine the encoded data based on the voltage difference, and determine the decoded version of the encoded data by decoding the encoded data.

Example #14: The transceiver of any of Examples #11-13 may feature the first electrode being positioned on a first portion of a casing string in the wellbore and the second electrode being positioned on a second portion of the casing string that is separated from the first portion by an insulation layer.

Example #15: The transceiver of any of Examples #11-14 may feature a fiber optic cable. A material can be coupled to the fiber optic cable and at least one of the first electrode or the second electrode for changing a strain on the fiber optic cable in response to the voltage difference between the first electrode and the second electrode.

Example #16: The transceiver of Example #15 may feature the material including an electrorestrictive material. The transceiver can include a processing device and a memory device in which instructions executable by the processing device are stored for causing the processing device to receive, from an optical sensor, sensor signals indicating a change in the strain on the fiber optic cable. The instructions can cause the processing device to determine, based on the change in the strain, the voltage difference between the first electrode and the second electrode.

Example #17: The transceiver of any of Examples #11-16 may feature the material and the first electrode forming at least a portion of an electrical circuit that is positionable in the adjacent wellbore. The electrical circuit can be electrically passive. The electrical circuit can have an input impedance that is greater than 1 mega ohm.

Example 18: A method can include determining, by a transceiver communicatively coupled to electrodes positioned proximate to a wellbore, a voltage across the electrodes in response to an electromagnetic signal that includes encoded data and was transmitted from another transceiver in an adjacent wellbore. The method can include determining, by the transceiver, the encoded data based on the voltage across the electrodes. The method can include determining, by the transceiver, a decoded version of the encoded data.

Example #19: The method of Example #18 may feature detecting an amount of strain imparted on a fiber optic cable by a material coupled to the fiber optic cable and electrically coupled to the electrodes based on a characteristic of an optical wave propagating through the fiber optic cable. The method may feature determining the voltage across the electrodes based on a predetermined relationship between the amount of strain in the fiber optic cable and the voltage associated with the electrodes. The method may feature determining the encoded data based on the voltage across the electrodes.

Example #20: The method of any of Examples #18-19 may feature a first electrode of the electrodes being positioned on a first portion of a casing string in the wellbore. A second electrode of the electrodes can be positioned on a second portion of the casing string that is separated from the first portion by an insulation layer. The voltage across the electrodes can be a voltage difference between the first electrode and the second electrode. The other transceiver can be positioned on a logging while drilling tool or a measuring whole drilling tool in the adjacent wellbore. The encoded data can be encoded in the electromagnetic signal using pulse width modulation, pulse position modulation, on-off keying, amplitude modulation, frequency modulation, single-side-band modulation, frequency shift keying, phase shift keying, discrete multi-tone, orthogonal frequency division multiplexing, or any combination of these. The wellbore can be a horizontal, deviated, or vertical wellbore.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
  a downhole transceiver coupled to a well tool that is positionable in a wellbore for transmitting an electromagnetic signal with encoded data;
  a first electrode positionable in an adjacent wellbore for receiving the electromagnetic signal and generating a first voltage in response to the electromagnetic signal;
  a second electrode positionable in the adjacent wellbore or at a surface of the adjacent wellbore for receiving the electromagnetic signal and generating a second voltage in response to the electromagnetic signal;
  a surface transceiver for coupled to a fiber optic cable and configured to determine a decoded version of the encoded data based on a voltage difference between the first electrode and the second electrode;
  and
  a material coupled to the fiber optic cable and the first electrode for changing a strain on the fiber optic cable in response to the voltage difference between the first electrode and the second electrode,
  wherein the material and the first electrode form at least a portion of an electrical circuit that is positionable in the adjacent wellbore and electrically passive, and wherein the electrical circuit has an input impedance that is greater than 1 mega ohm.

2. The system of claim 1, wherein the well tool is a logging while drilling tool or a measuring while drilling tool.

3. The system of claim 2, wherein the encoded data is encoded in the electromagnetic signal using pulse width modulation, pulse position modulation, on-off keying, amplitude modulation, frequency modulation, single-sideband modulation, frequency shift keying, phase shift keying, discrete multi-tone, or orthogonal frequency division multiplexing.

4. The system of claim 3, wherein the surface transceiver comprises a processing device and a memory device in which instructions executable by the processing device are stored for causing the processing device to:
determine the encoded data based on the voltage difference; and
determine the decoded version of the encoded data by decoding the encoded data.

5. The system of claim 4, wherein the first electrode is positioned on a first portion of a casing string in the adjacent wellbore and the second electrode is positioned on a second portion of the casing string that is separated from the first portion by an insulation layer.

6. The system of claim 4, wherein the first electrode is positioned in the adjacent wellbore and the second electrode is positioned at the surface of the adjacent wellbore.

7. The system of claim 6, wherein the first electrode is a part of a second well tool positioned in the adjacent wellbore.

8. The system of claim 1, wherein the material comprises an electrorestrictive material, and the surface transceiver comprises a processing device and a memory device in which instructions executable by the processing device are stored for causing the processing device to:
receive, from an optical sensor, sensor signals indicating a change in the strain on the fiber optic cable; and
determine, based on the change in the strain, the voltage difference between the first electrode and the second electrode.

9. A transceiver comprising:
a first electrode positionable in a wellbore for receiving, from another transceiver positioned in an adjacent wellbore, an electromagnetic signal that includes encoded data and generating a first voltage in response to the electromagnetic signal;
a second electrode positionable in the wellbore or at a surface of the wellbore for receiving the electromagnetic signal and generating a second voltage in response to the electromagnetic signal;
a fiber optic cable coupled to the first electrode via a material configured to change a strain on the fiber optic cable in response to a difference between the first voltage and the second voltage, wherein the material and the first electrode form at least a portion of an electrical circuit that is positionable in the wellbore and electrically passive, and wherein the electrical circuit has an input impedance that is greater than 1 mega ohm; and
a computing device coupled to a fiber optic cable and configured to determine a decoded version of the encoded data based on the difference between the first voltage and the second voltage.

10. The transceiver of claim 9, wherein the encoded data is encoded in the electromagnetic signal using pulse width modulation, pulse position modulation, on-off keying, amplitude modulation, frequency modulation, single-sideband modulation, frequency shift keying, phase shift keying, discrete multi-tone, or orthogonal frequency division multiplexing.

11. The transceiver of claim 9, wherein the computing device comprises a processing device and a memory device in which instructions executable by the processing device are stored for causing the processing device to:
determine the encoded data based on the difference between the first voltage and the second voltage; and
determine the decoded version of the encoded data by decoding the encoded data.

12. The transceiver of claim 9, wherein the first electrode is positioned on a first portion of a casing string in the wellbore and the second electrode is positioned on a second portion of the casing string that is separated from the first portion by an insulation layer.

13. The transceiver of claim 9 wherein the material comprises an electrorestrictive material, and the computing device comprises a processing device and a memory device in which instructions executable by the processing device are stored for causing the processing device to:
receive, from an optical sensor, sensor signals indicating a change in the strain on the fiber optic cable; and
determine, based on the change in the strain, a voltage difference between the first electrode and the second electrode.

14. A method comprising:
detecting, by a first transceiver coupled to a fiber optic cable, a strain imparted on the fiber optic cable by a material in response to an electromagnetic signal being received at a first electrode positioned in a wellbore and a second electrode, wherein the electromagnetic signal is transmitted from a second transceiver that is positioned in an adjacent wellbore, wherein the material is coupled between the first electrode and the fiber optic cable for imparting the strain on the fiber optic cable in response to the electromagnetic signal, and wherein the material and the first electrode form at least a portion of an electrical circuit that is electrically passive and has an input impedance that is greater than 1 mega ohm;
determining, by the first transceiver, a voltage across the first electrode and the second electrode based on a predetermined relationship between the strain in the fiber optic cable and the voltage; and
determining, by the first transceiver, data encoded in the electromagnetic signal based on the voltage across the first electrode and the second electrode.

15. The method of claim 14, wherein:
the voltage across the first electrode and the second electrode is a voltage difference between the first electrode and the second electrode; and
the first electrode is positioned in the wellbore.

16. The method of claim 15, wherein the second transceiver is positioned on a logging while drilling tool or a measuring whole drilling tool in the adjacent wellbore.

17. The method of claim 15, wherein the second electrode is positioned at a surface of the wellbore.

18. The method of claim 14, wherein the data is encoded in the electromagnetic signal using pulse width modulation, pulse position modulation, on-off keying, amplitude modulation, frequency modulation, single-side-band modulation, frequency shift keying, phase shift keying, discrete multi-tone, or orthogonal frequency division multiplexing.

19. The method of claim 14, wherein the first electrode is positioned on a first portion of a casing string in the wellbore and the second electrode is positioned on a second portion of the casing string that is separated from the first portion by an insulation layer.

20. The method of claim 14, wherein the first electrode or the second electrode is positioned on a well tool in the wellbore.

* * * * *